(12) United States Patent
Hancock

(10) Patent No.: US 7,988,423 B2
(45) Date of Patent: Aug. 2, 2011

(54) WIND TURBINE BLADE

(75) Inventor: Mark Hancock, Newport (GB)

(73) Assignee: Vestas Wind Systems A/S, Randers SV (DK)

( * ) Notice: Subject to any disclaimer, the term of this patent is extended or adjusted under 35 U.S.C. 154(b) by 0 days.

(21) Appl. No.: 13/054,530

(22) PCT Filed: Jul. 17, 2009

(86) PCT No.: PCT/EP2009/005211
§ 371 (c)(1),
(2), (4) Date: Jan. 17, 2011

(87) PCT Pub. No.: WO2010/006807
PCT Pub. Date: Jan. 21, 2010

(65) Prior Publication Data
US 2011/0123346 A1    May 26, 2011

Related U.S. Application Data

(60) Provisional application No. 61/135,337, filed on Jul. 18, 2008.

(30) Foreign Application Priority Data

Jul. 18, 2008 (GB) .................................. 0813240.9

(51) Int. Cl.
*F03D 1/06* (2006.01)
(52) U.S. Cl. ..................... 416/229 R; 416/226; 416/230; 416/241 A

(58) Field of Classification Search ................... 416/226, 416/229 R, 230, 241 A
See application file for complete search history.

(56) References Cited

U.S. PATENT DOCUMENTS 6,835,436 B1 * 12/2004 Reif et al. ..................... 428/119
7,364,407 B2 * 4/2008 Grabau et al. ............ 416/229 R
(Continued)

FOREIGN PATENT DOCUMENTS
FR     2823070 A1    10/2002
(Continued)

OTHER PUBLICATIONS

Calama A. Areal; International Search Reported issued in priority international application No. PCT/EP2009/005221; Nov. 4, 2010; 3 pages; European Patent Office.

(Continued)

*Primary Examiner* — Ninh H Nguyen
*Assistant Examiner* — Liam McDowell
(74) *Attorney, Agent, or Firm* — Wood, Herron & Evans, L.L.P.

(57) ABSTRACT

The invention relates to a wind turbine blade having at least one component formed of a fibrous composite material including two or more different types of carbon fibres having a different elastic modulus to each other. The proportions of the different types of fibres vary in the longitudinal direction of the blade such that the elastic modulus of the fibrous composite material increases towards the tip end of the blade. The two or more different types of carbon fibres may be incorporated in an inner beam and/or in the outer shell portions of the blade.

13 Claims, 2 Drawing Sheets

U.S. PATENT DOCUMENTS

| | | | |
|---|---|---|---|
| 7,377,752 B2 * | 5/2008 | Mohamed | 416/226 |
| 7,521,105 B2 * | 4/2009 | Bech et al. | 428/60 |
| 7,802,968 B2 * | 9/2010 | Jacobsen | 416/228 |
| 2005/0186081 A1 | 8/2005 | Mohamed | |
| 2006/0083907 A1 | 4/2006 | Bech et al. | |
| 2007/0189903 A1 | 8/2007 | Eyb | |
| 2008/0159871 A1 * | 7/2008 | Bech | 416/229 R |

FOREIGN PATENT DOCUMENTS

| | | |
|---|---|---|
| WO | 03/078833 | 9/2003 |

OTHER PUBLICATIONS

Calama A. Areal; International Written Opinion issued in priority international application No. PCT/EP2009/005211; Nov. 4, 2010; 4 pages; European Patent Office.

John Twin; Search Report issued in priority UK patent application No. GB0813240.9; Nov. 12, 2008; 4 pages; UK Intellectual Property Office.

\* cited by examiner

WIND TURBINE BLADE

FIELD OF THE INVENTION

The present invention relates to a blade for a wind turbine. In particular, the invention relates to a blade having at least one component formed from a composite material reinforced with two or more different types of carbon fibres having a different elastic modulus to each other.

BACKGROUND OF THE INVENTION

With the development of increasingly large wind turbines, there is a requirement for wind turbine blades of greater length. However, the use of longer blades poses a number of problems. One such problem is that as the blades get longer, the flatwise bending of the tip of the blade during use increases and there is therefore a greater risk of the blade tip colliding with the tower of the wind turbine during high winds. In order to ensure that there is sufficient clearance between the blades and the tower at all times, it is necessary either to mount the blades at a greater distance from the turbine tower, or alternatively, to increase the stiffness of the blade tips such that the deflection is reduced. The latter of these solutions is preferred since the first solution is known to increase the costs of the wind turbine as a whole.

It has also been recognised that it is advantageous to reduce the tip chord of wind turbine blades as much as possible. Blades with a narrower tip chord offer a number of advantages over standard blades, including reduced loads and cost for the rest of the turbine. However, the problem of tip deflection, as described above, becomes greater as the tip portion of the blade gets narrower. The larger part of the tip deflection is generated in the outer part of the blade towards the tip end where there is less material. Blades with a reduced tip chord are therefore only viable if they can be formed from materials having a sufficiently high level of stiffness, to compensate for the reduced stiffness of the blade tip portion arising from the smaller cross-section. It is generally more economically viable to stiffen the blade towards the tip end, where there is less material.

Conventionally, composite materials reinforced with glass fibres have been used to produce wind turbine blades. However, to obtain the higher level of stiffness required for longer and/or narrower blades, increased amounts of glass fibres are required. This results in a heavier and less efficient blade.

Carbon fibres are also used in composite materials for use in wind turbine blades despite their higher raw material costs, since they are lighter and stiffer than glass fibres and therefore offer improved reinforcement. WO-A-03/078832 and WO-A-03/078833 both disclose a wind turbine blade having a tip end portion made substantially from carbon fibre-reinforced polymer and a root end portion made substantially from glass fibre-reinforced polymer. Also, EP 1 746 284 discloses a wind turbine blade in which the outer shell halves are reinforced by the inclusion of pre-fabricated strips of carbon fibres.

It would be desirable to provide an improved wind turbine blade, which is formed from a material that optimises the strength and stiffness of the blade, such that the deflection of the tip end of the blade can be reduced. It would be particularly desirable to provide a blade with sufficient stiffness at the tip that the tip chord could be significantly reduced, without the problem of tip deflection. It would also be desirable to provide a wind turbine blade of increased length compared to standard blades, which is both efficient and cost effective.

SUMMARY OF THE INVENTION

According to the present invention there is provided a wind turbine having a tip end and a root end and comprising at least one component formed of fibrous composite material including two or more different types of carbon fibres having a different elastic modulus to each other, wherein the proportions of the different types of carbon fibres in the at least one component vary in the longitudinal direction of the blade, such that the elastic modulus of the fibrous composite material increases towards the tip end of the blade.

The "at least one component" may be any element of the blade, including but not limited to the inner beam or webs, the spar caps, the outer shell portions, or a connecting member between two elements of the blade.

The term "fibrous composite material" refers to a material comprising a resin through which reinforcement fibres have been distributed.

The term "fibres" is used to refer to particles that have an aspect ratio (length/equivalent diameter) of more than 10. By equivalent diameter is meant the diameter of a circle having the same area as the cross sectional area of the particle.

The "elastic modulus" of a material is defined as the gradient of the stress-strain curve of the material in the elastic deformation region and is a measure of the stiffness of the material. The unit of elastic modulus is the Pascal (Pa). Stiffer materials have higher values of elastic modulus. The stiffness of a wind turbine blade at any point along its length will depend upon the elastic modulus of the fibrous composite material and the cross sectional area at that point. The elastic modulus is otherwise known as the "modulus of elasticity" or "Young's modulus".

The proportion of each type of carbon fibre in a blade component at any point along the length of the blade is equal to the fraction of that type of fibre in the total amount of carbon fibres that is incorporated in the component at that point.

Carbon fibres are fibres in which the main constituent is carbon. For example, carbon fibres include fibres containing graphite, amorphous carbon or carbon nano-tubes. The carbon fibres may be produced from polyacrylonitrile (PAN), pitch or rayon precursors.

Advantageously, carbon fibres have a significantly higher stiffness to density ratio than glass fibres and therefore can provide the same or a higher value of elastic modulus to a composite material as glass fibres with a much lower weight of fibres. Although the cost per unit mass of carbon is greater than that of glass, since a lower weight of carbon than glass is required to provide the required elastic modulus, the total cost of the blades according to the invention need not be much higher than that of standard blades of corresponding length.

An additional advantage of using of carbon fibres in place of glass fibres in a wind turbine blade is that the overall weight of the blade is significantly reduced. As a result, the loading on the inner beam and other parts of the turbine is also reduced.

Carbon fibres having a wide variety of different levels of elastic modulus are available and this means that there is excellent flexibility in the design of blades according to the invention and in particular, in the variation of the elastic modulus of the fibrous composite material forming the components of the wind turbine. Standard modulus carbon fibres have an elastic modulus of about 230 GPa whilst the highest modulus carbon fibres may have an elastic modulus of as much as 800 GPa. Many different types of carbon fibres having an intermediate value of elastic modulus between these two values are also available. Preferably, blades according to the invention include at least one type of carbon fibres having an elastic modulus of greater than 230 GPa and more preferably the blade includes at least one type having an elastic modulus of greater than 280 GPa.

Typically, the cost of the carbon fibres increases as the elastic modulus increases. It is therefore undesirable from an economic point of view to use the more expensive, higher modulus types of carbon all along the blade and to use higher modulus carbon than is required at any point along the blade.

By combining two or more different types of carbon fibres of differing elastic modulus to each other in blades according to the invention and by varying the proportions of the different types, it is possible to provide excellent overall reinforcement to the blade whilst ensuring that the blade remains as cost-effective as possible. The wide range of types of carbon fibre of different elastic modulus that are available means that the overall stiffness of the blade can be tailored very precisely to reflect the varying loads to which each part of the blade is subjected. The carbon fibres incorporated at any one point along the blade can be selected so that the stiffness of the blade need never be higher than required at that point, thereby ensuring that the cost of the carbon fibres is kept to a minimum. The tailoring of the elastic modulus of the composite material may also enable the cross section of the blade to be further optimised along its length without material stiffness limitation.

The combination of two or more types of carbon fibres of differing elastic modulus to each other may have other advantages for the material properties of the blade. For example, the carbon fibres tend to become more brittle as they become stiffer and it may therefore be advantageous to incorporate lower modulus carbon fibres, even in parts of the blade where a high proportion of higher modulus fibres are required, in order to prevent the resultant fibrous composite material becoming too brittle.

The proportions of the two or more different types of carbon fibres having different elastic modulus to each other are varied in the longitudinal direction of the blade in order to achieve the desired pattern of stiffness along the length of the blade. If desired, the proportions of the different types of carbon fibres may also be varied along the width of the blade. In order to obtain a component in which the elastic modulus of the fibrous composite material increases towards the tip end of the blade, the ratio of high and/or intermediate modulus carbon fibres to standard modulus carbon fibres is preferably increased towards the tip end.

The blades according to the invention have increased stiffness at the outer end furthest from the turbine hub and this is advantageous since it reduces the flatwise bending deflection of the blade tip during use, thereby ensuring sufficient clearance between the blades and the turbine tower, even in high winds. Even with longer blades, the turbines can therefore be built with the blades closer to the turbine tower, which is preferable in terms of the construction of the turbine. The reduction of the bending of the tip of the blade also reduces the loading on the inner parts of the blade and the rest of the turbine. Furthermore, the use of fibrous composite materials having a higher elastic modulus will advantageously reduce the dynamic edgewise bending of the blade during use.

With the use of composite materials with a higher elastic modulus towards the tip end of the blade, both the tip chord and tip thickness can be reduced compared to standard wind turbine blades. This is advantageous not only because the reduction in cross section means that the weight if reduced but also because the fatigue loads on the inner part of the blade and the rest of the turbine are reduced. In addition, the reduction of the thickness to chord ratio at the tip optimises the aerodynamics of the blade.

The carbon fibres in blades of the present invention may be provided in any orientation in the fibrous composite material. For example, the fibres may be oriented unidirectionally, biaxially or randomly. Preferably, the fibres are mainly oriented unidirectionally, to provide higher bending stiffness and strength to the beam. Most preferably, the fibres are oriented unidirectionally in the longitudinal direction of the beam.

The term "unidirectional" is intended to mean that at least 75% of the fibres are oriented in one direction or within 10 degrees of that direction.

The strength and stiffness of the carbon fibres will depend upon how straight the fibres are. Any bends or kinks in a fibre will lead to a stress concentration and will therefore reduce the strength of the fibre. Preferably, the carbon fibres are therefore provided in substantially straight lines, with the number and size of any bends or kinks reduced as much as possible.

In certain embodiments of the present invention, the proportions of the different types of carbon fibres in the at least one component vary in the longitudinal direction of the blade such that along at least a part of the at least one component the increase in elastic modulus of the fibrous material is continuous, or gradual.

This continuous increase in the elastic modulus of the fibrous composite material of the at least one component may be achieved by, for example, gradually introducing carbon fibres of higher elastic modulus towards the tip end of the blade or by gradually increasing the ratio of higher modulus fibres to standard modulus fibres. The gradual change in elastic modulus prevents an abrupt or sudden change in the stiffness of the component at one or more points along its length, which may be undesirable since stress concentrations are typically found around the region where the stiffness changes.

In alternative embodiments, the increase in the elastic modulus of the fibrous composite material is a stepwise increase.

The at least one component of the blade may be formed of two or more connected portions having different proportions of the different types of carbon fibres to each other, such that the elastic modulus of the fibrous composite material forming each of the portions is different. In addition, the variation in the proportions of the different types of carbon fibres in each portion may be different to the other portion or portions.

As the size of wind turbine blades increases, it may become less feasible to produce and transport one-piece blades. It may therefore desirable to prepare smaller portions of the blade components and connect the smaller portions together to form the final structure at a later stage and/or facility.

The two or more portions may be connected to each other directly, or indirectly by means of an intermediate connecting member. The inclusion of a connecting member increases the mechanical strength of the blade at the join between the portions and may be particularly advantageous when the mechanical properties of the portions being connected together are different, since there may be a concentration of stress in areas of the beam where there is a sudden transition in, for example, the stiffness.

It is important for the connecting member to provide a strong joint between the different portions of the blade since the joint must be capable of withstanding high stresses. The connecting member therefore preferably also comprises two or more different types of carbon fibres of different elastic modulus to each other. The fibres in the connecting member may be oriented at any angle relative to the fibres in the tip end and root end portions but are preferably oriented at an angle to the interface between the portions. This increase the mechanical strength of the connection, compared to when the fibres are parallel to the interface. Examples of suitable connecting members are described in, for example, WO-A-2004/078462 and US-A-2006/0083907.

The proportions of the different types of carbon fibres in the at least one component may vary in the longitudinal direction of the blade to provide at least two regions in which the fibrous composite material has a higher elastic modulus than in the rest of the component. This may be desirable for a number of reasons, for example, to tailor the natural frequencies of the blade.

In a first preferred embodiment of the present invention, the wind turbine blade comprises a longitudinal inner beam extending through the centre of the blade, wherein the inner beam is formed of fibrous composite material including two or more different types of carbon having a different elastic modulus to each other, wherein the proportions of the different types of fibres vary in the longitudinal direction of the inner beam such that the elastic modulus of the fibrous composite material increases towards the tip end of the blade.

The proportions of the different types of carbon fibres may vary substantially continuously along the beam or may vary in a stepwise manner. Preferably, there is a continuous increase in the elastic modulus of the fibrous material forming the beam towards the tip end, which may be achieved by increasing the proportion of higher modulus carbon fibres towards the tip end. In addition to the region of higher elastic modulus towards the tip end, the beam may include one or more other regions along its length where the fibrous composite material has a higher elastic modulus than in the rest of the beam.

Wind turbine blades according to the first embodiment of the invention are preferably of a known design, in which the blade comprises two or more outer shell portions forming the airfoil of the blade and one or more central, inner beams which extends longitudinally through the inner cavity of the blade and are connected to each of the outer shell portions. Typically, the inner beam is the main load-bearing component and it is therefore important to optimise its stiffness, particularly at the tip end of the blade. The outer shell portions may or may not contribute significantly to the overall stiffness of the blades. Depending on the stiffness required, the outer shell portions may include one or more different types of carbon fibres.

The inner beam is preferably quadrangular in cross-section but other cross-sections may also be suitable, such as a circular, I-shaped or C-shaped cross-section. Inner beams of I-shaped or C-shaped cross-section are sometimes referred to as webs. The cross-section of the inner beam may be adapted in order to optimise the contact between the inner beam and the outer shell portions. For example, the surfaces of the beam to which the outer shell portions are connected (known as the "spar caps") may be shaped such that the contact area between the beam and the outer shell portions is maximised. Typically, to account for the decreasing size of the cross-section of the blade towards the tip end, there will be a corresponding decrease in the cross-section of the inner beam towards the tip end.

During use, the loading will be different on the different sides of the inner beam. For example, at any one time, one of the spar caps of the beam will be mainly loaded in tension, whilst the opposed spar cap will mainly be loaded in compression. The one or more sides, or webs extending between the spar caps will be mainly shear loaded. The forces on each side of the beam will alter as the wind passes the turbine blade. During use, the spar caps are subjected to considerably greater forces than the connecting sides or webs and therefore the majority of the reinforcement in the beam is provided in the spar caps. Preferably, therefore, the elastic modulus of the fibrous composite material forming the spar caps is greater than that in the remainder of the beam.

The increase in the elastic modulus of the spar caps through the inclusion of higher modulus carbon fibres enables the thickness of the spar caps to be reduced. The distance between the centroids of the two spar caps is increased and advantageously, the amount of material required to form the spar caps is reduced. In addition, there is an increase in the flatwise bending stiffness per unit area of the spar cap. The overall efficiency and cost of the blades is therefore optimised.

The spar caps of the inner beam may be formed from a single layer material but are preferably formed from a laminar material comprising two or more layers of the same, or differing materials. Some, or all of the layers of the laminar material may comprise carbon fibres. The carbon fibres in each layer may be oriented in the same or a different direction to the fibres in the adjoining layer or layers. In certain embodiments, the orientation of the layers may be varied in order to alter the mechanical properties of the material. An example of a suitable laminar material is described in WO 2004/078465.

The spar caps may be completely covered by the outer shell portions, or may be at least partially exposed, so that their surfaces form a part of the exterior surface of the blade.

The inner beam of blades according to the first preferred embodiment of the present invention may be formed of two or more connected portions. For example, the inner beam may comprise an outer, tip end portion and an inner, root end portion, which are formed separately but connected together to form the final beam. The proportions of the different types of carbon fibres are different in the tip end portion than in the root end portion, such that the elastic modulus of the fibrous composite material forming the tip end portion is higher than that of the fibrous composite material forming root end portion. This could be achieved by, for example, incorporating a higher proportion of higher modulus carbon fibres into the tip portion than the root portion. Within each portion, the proportions of the different types of carbon may also be varied in the longitudinal direction of the blade to account for the differences in loading at different positions along the length of that portion.

In a second preferred embodiment of the present invention, the wind turbine blade comprises two or more outer shell portions, wherein each of the outer shell portions is at least partially formed of fibrous composite material comprising two or more different types of carbon fibres having a different elastic modulus to each other.

The proportions of the different types of carbon fibres may vary continuously along the outer shell portions or may vary in a stepwise manner. Preferably, there is a continuous increase in the elastic modulus of the fibrous composite material forming the outer shell portions towards the tip end of the blade, which may be achieved by increasing the ratio of higher modulus carbon fibres to the lower modulus carbon fibres towards the tip end. In addition to the higher elastic modulus of the fibrous composite material at the outer end of the blade, the shell portions may include one or more other regions along their length where the elastic modulus is higher than in the rest of the component.

Wind turbine blades according to the second embodiment of the invention are preferably also of a known design in which the blade comprises two or more outer shell portions and a pair of central, inner webs which connect the outer shell portions and extend longitudinally through the interior of the blade. Typically, the reinforced outer shell portions are the main load-bearing components and it is therefore important to optimise their stiffness, particularly at the tip end of the blade.

Due to the increased stiffness of the outer shell portions, the inner webs contribute significantly less to the overall stiffness of the blades than the inner beam of the first embodiment. The webs are preferably formed of a composite material comprising glass and carbon fibres and may incorporate two or more different types of carbon fibres, which vary along the longitudinal length of the beam in a manner analogous to the inner beam of the first embodiment, as described above. Depending on the stiffness required, the proportion and elastic modulus of the carbon fibres in the webs can be varied. Each web may take the form of, for example, a C-beam.

Preferably, strips of the fibrous composite material including the two or more different types of carbon fibres extend in a longitudinal direction along the blade. The strips of composite material may be incorporated into a layer, which further comprises strips of a non-carbon material such as wood. An example of such a layer is described, for example, in EP-A-1,746,284.

The strips of fibrous composite material may extend along substantially the entire length of the blade, or just a portion thereof.

Preferably, at least some of the strips are pultruded fibrous composite strips, known as "pultrusions", which are formed by pultruding a mixture of fibres, and a matrix material that is cured after pultrusion.

The resin in the fibrous composite material of blades according to the present invention may be a thermoplastic or thermosetting resin, but preferably a thermosetting resin is used for reasons of chemical and thermal stability. The resin may be based on, for example, unsaturated polyester, polyurethane, polyvinyl ester, epoxy or combinations thereof. Most preferably, the resin is an epoxy resin. Resin formations are well known in the art.

The resin may be provided as liquid, semisolid or solid resin. It may comprise two or more resin systems which may or may not be based on the same type of resin, such as two or more epoxy-based systems. Through the use of two or more resin systems, it may be possible to optimise the properties of the resin for the subsequent steps of processing, for example with respect to viscosity and timing/controlling of the curing process.

The reinforcing fibres may be provided in any suitable form including but not limited to: prepregs, semi-pregs, woven or non-woven fabrics, mats, pre-forms, individual or groups of fibres, tows and tow-pregs.

The term "prepreg" refers to a substantially or fully impregnated collection of fibres, fibre tows, woven or non-woven fabric. Woven and non-woven fabrics are collections of individual fibres or fibre tows that are substantially dry, that is, not impregnated by a resin. Fibre tows are bundles of large numbers of individual fibres.

The term "semi-preg" refers to a partially impregnated collection of fibres or fibre tows.

The partial impregnation provides for enhanced removal of gas through or along the dry fibres during consolidation and/or curing.

The term "tow-preg" refers to an at least partially impregnated fibre tow.

The term "pre-form" refers to a composite material comprising fibres and cured or uncured resin. The fibres are preferably provided in layers of oriented fibres. Examples of pre-forms and methods of preparing pre-forms are described in WO-A-2004/078442. In order to reduce waste, the pre-forms may be provided as a pre-formed slab, which has been produced with the desired shape and size so that it can be incorporated directly into the blade.

The components formed from the fibrous composite material may be unconsolidated or at least partially consolidated. The term "consolidated" means that most, if not all of the gas has been removed from inside the beam or part thereof, giving a lower porosity. Pre-consolidated pre-forms are particularly suitable for use in the inner beam of wind turbine blades, since they provide good reproducibility, high strength and high homogeneity, and can be connected to other pre-forms or structures.

The fibrous composite material forming the at least one component of the blade may be uncured, partially cured or fully cured. Typically, the curing of the material increases the stiffness.

In addition to the two or more different types of carbon fibres, the at least one component of the blade may include one or more types of non-carbon reinforcement fibres, for example, glass fibres, aramid fibres, synthetic fibres (e.g. acrylic, polyester, PAN, PET, PE, PP or PBO fibres), bio fibres (e.g. hemp, jute, cellulose fibres), mineral fibres (e.g. Rockwool®), metal fibres (e.g. steel, aluminium, brass, copper fibres) and boron fibres. These non-carbon fibres may be incorporated to improve particular properties of the component, such as shear strength or thermal properties.

BRIEF DESCRIPTION OF THE DRAWINGS

The invention will be further described, by way of example only, with reference to the following figures in which.

DETAILED DESCRIPTION OF EMBODIMENTS

Figure 1:
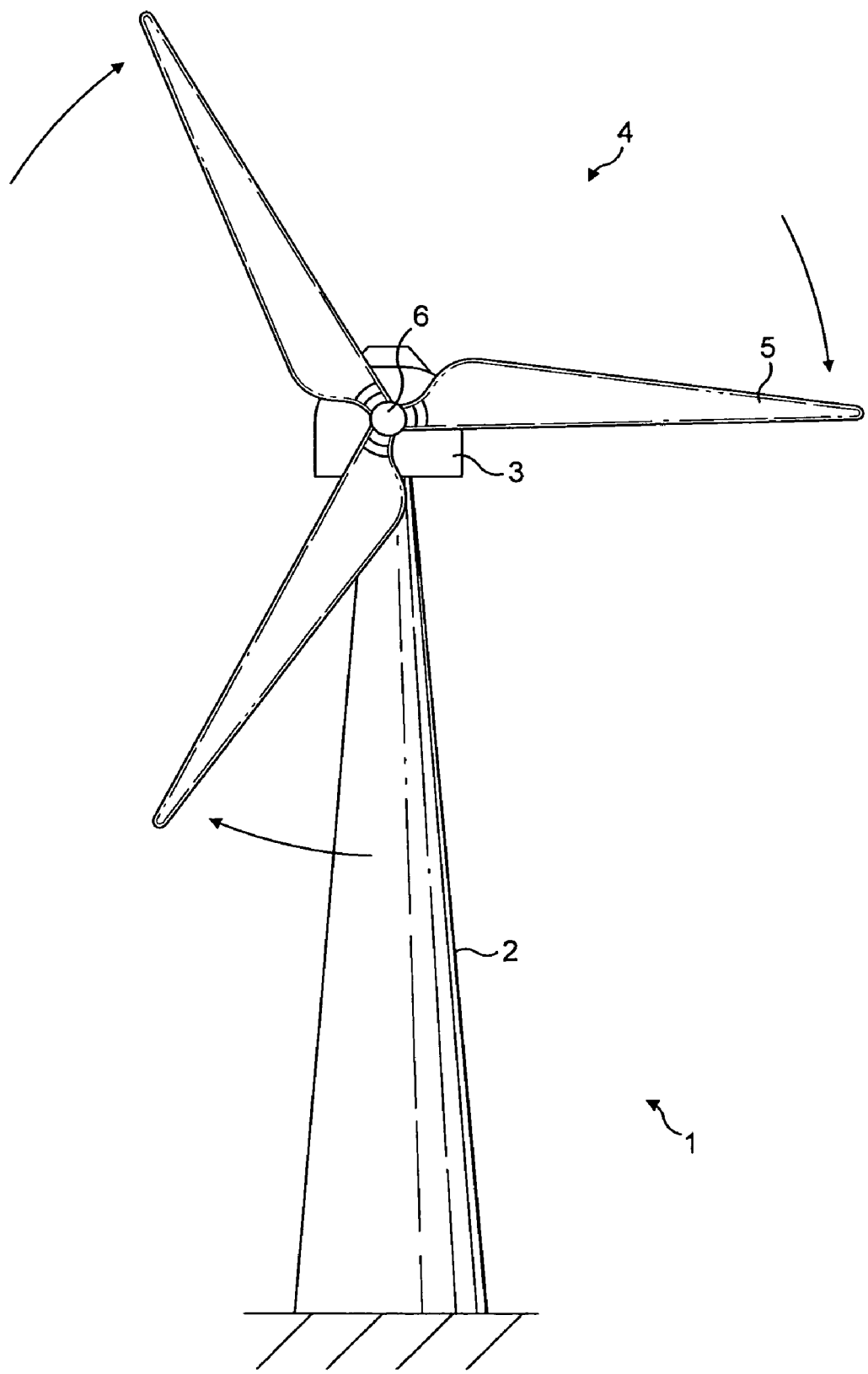
FIG. 1 shows a wind turbine with three blades.

FIG. 1 illustrates a wind turbine 1 comprising a wind turbine tower 2 on which a wind turbine nacelle 3 is mounted. A wind turbine rotor 4 comprising at least one wind turbine blade 5 is mounted on a hub 6. The hub 6 is connected to the nacelle 3 through a low speed shaft (not shown) extending from the nacelle front. The wind turbine illustrated in FIG. 1 may be a small model intended from domestic or light utility usage, or may be a large model used, such as those that are suitable for use in large scale electricity generation on a wind farm for example. In the latter case, the diameter of the blades could be as large as around 100 metres.

Figure 2:
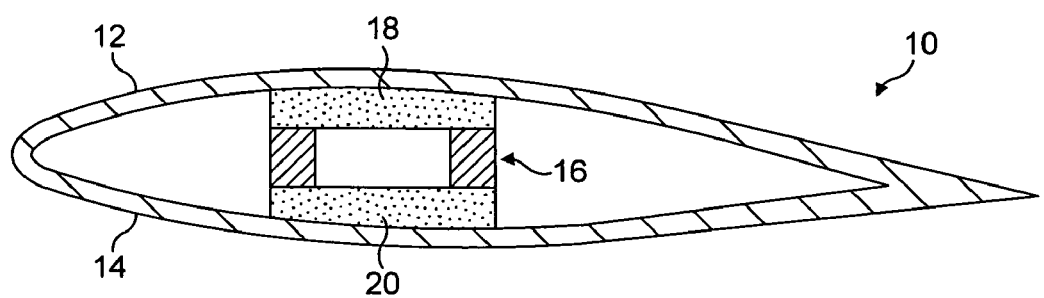
FIG. 2 shows a cross section through a blade according to the first embodiment of the invention.

A cross section of a blade 10 according to a first embodiment of the present invention is shown in FIG. 2. The blade 10 is suitable for mounting on a wind turbine of the type shown in FIG. 1 and described above. The general design of the blade 10 is similar to that of well known, existing blades and comprises upper 12 and lower 14 outer shell halves and a central, inner beam 16, which extends longitudinally through the interior of the blade 10.

The beam 16 is of a generally quadrangular cross section and is connected to the outer shell halves 12,14 along upper 18 and lower 20 spar caps. The beam 16 is formed from an epoxy resin composite material including carbon reinforcement fibres, which are aligned in the longitudinal direction of the beam. The majority of the carbon fibres are incorporated in the spar caps 18,20 of the beam.

At the root end of the blade, the majority of the carbon fibres incorporated in the beam are of a standard modulus, having a Young's modulus of around 250 GPa. Higher modulus carbon fibres having a Young's modulus of approximately 280 GPa are gradually introduced into the beam towards the tip end of the blade, such that there is a gradual increase in the elastic modulus of the fibrous material forming the beam from the root end to the tip end.

Figure 3:
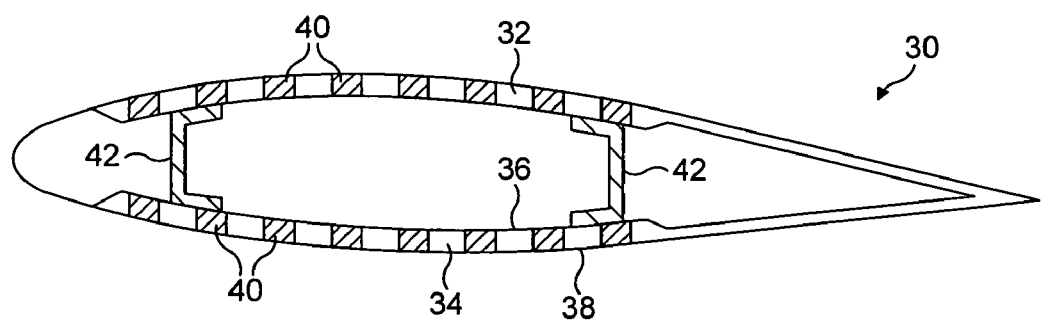
FIG. 3 shows a cross-section through a blade according to the second embodiment of the invention.

The blade 30 according to the second embodiment of the invention shown in cross section in FIG. 3 may be used as an alternative to the blade shown in FIG. 2 in the turbine of FIG. 1.

The general design of blade 30 is similar to that of well known, existing blades and comprises an upper layer 32 and a lower layer 34, each formed from an epoxy resin composite material incorporating strips of pultruded carbon fibres 40 which extend in a longitudinal direction along the blade. Each layer 32,34 is sandwiched between a thin inner layer 36 and outer layer 38 of glass and epoxy resin skin. A pair of C-beams 42 formed of a glass reinforced fibrous web extends between the upper 32 and lower 34 composite layers.

As in the beam 16 of the blade shown in FIG. 2 and described above, the majority of the carbon fibres incorporated at the root end of the blade 30 are of a standard modulus and carbon fibres of a higher modulus are gradually incorporated into the composite layers 32,34 towards the tip end of the blade. The elastic modulus of the composite layers 32,34 therefore gradually increases from the root end of the blade 30 towards the tip end thereof.

It will be appreciated that one or more additional types of carbon fibres having intermediate values of Young's modulus may be introduced into the blades of FIGS. 2 and 3 between the root end and the tip end of the blade, in order to achieve the desired elastic modulus of the fibrous composite material at all points along the length of the blade.

The invention claimed is:

1. A wind turbine blade having a tip end and a root end and comprising at least one component formed of fibrous composite material including two or more different types of carbon fibres having a different elastic modulus to each other, wherein the proportions of the different types of carbon fibres in the at least one component vary in the longitudinal direction of the blade, such that the elastic modulus of the fibrous composite material increases towards the tip end of the blade.

2. The wind turbine blade according to claim 1 wherein the proportions of the different types of carbon fibres in the at least one component vary in the longitudinal direction of the blade such that along at least a part of the blade, the increase in the elastic modulus of the fibrous composite material is continuous.

3. The wind turbine blade according to claim 1 wherein the at least one component comprises two or more connected portions having different proportions of the different types of carbon fibres to each other, such that the elastic modulus of the fibrous composite material forming each of the portions is different.

4. The wind turbine blade according to claim 3 comprising a connecting member between the two or more connected portions.

5. The wind turbine blade according to claim 4 wherein the connecting member is formed of fibrous composite material comprising two or more different types of carbon fibres having a different elastic modulus to each other.

6. The wind turbine blade according to any preceding claim 1 wherein the proportions of the different types of carbon fibres in the at least one component vary in the longitudinal direction of the blade to provide at least two regions in which the fibrous composite material has a higher elastic modulus than in the rest of the component.

7. A wind turbine blade according to claim 1 comprising a longitudinal inner beam extending through the centre of the blade, wherein the inner beam is formed of fibrous composite material including two or more different types of carbon fibres having a different elastic modulus to each other, wherein the proportions of the different types of fibres vary in the longitudinal direction of the inner beam such that the elastic modulus of the fibrous composite material forming the beam increases towards the tip end of the blade.

8. The wind turbine blade according to claim 7 wherein the inner beam comprises a tip end portion and a root end portion and wherein the proportions of the different types of carbon fibres are different in the tip end portion than in the root end portion, such that the elastic modulus of the fibrous composite material is higher in the tip end portion than in the root end portion.

9. The wind turbine blade according to claim 8 wherein the proportions of the different types of carbon fibres within each of the tip end portion and the root end portion vary in the longitudinal direction of the blade.

10. The wind turbine blade according to any preceding claim 1 comprising two or more outer shell portions, wherein each of the outer shell portions is formed of fibrous composite material comprising two or more different types of carbon fibres having a different elastic modulus to each other.

11. The wind turbine blade according to claim 1 wherein at least one of the different types of carbon fibres has an elastic modulus of greater than 230 GPa.

12. The wind turbine blade according to claim 1 wherein at least one of the different types of carbon fibres has an elastic modulus of greater than 280 GPa.

13. The wind turbine blade according to claim 1 further comprising non-carbon fibres.

* * * * *

UNITED STATES PATENT AND TRADEMARK OFFICE
CERTIFICATE OF CORRECTION

| | |
|---|---|
| PATENT NO. | : 7,988,423 B2 |
| APPLICATION NO. | : 13/054530 |
| DATED | : August 2, 2011 |
| INVENTOR(S) | : Mark Hancock |

It is certified that error appears in the above-identified patent and that said Letters Patent is hereby corrected as shown below:

In the Specification:

Column 4, lines approx. 51-52, "may therefore desirable", should read --may therefore be desirable--.

Column 8, line approx. 50, "intended from", should read --intended for--.

In the Claims:

Column 10, claim 6, lines approx. 14-15, "any preceding claim 1", should read --claim 1--.

Column 10, claim 10, lines approx. 40-41, "any preceding claim 1", should read --claim 1--.

Signed and Sealed this
Thirteenth Day of March, 2012

David J. Kappos
*Director of the United States Patent and Trademark Office*